US009356813B2

(12) United States Patent  
Liberg et al.

(10) Patent No.: US 9,356,813 B2  
(45) Date of Patent: May 31, 2016

(54) CAPACITY FOR NARROW-BAND HYBRID MODULATION

(71) Applicant: TELEFONAKTIEBOLAGET L M ERICSSON (PUBL), Stockholm (SE)

(72) Inventors: Olof Liberg, Stockholm (SE); Mårten Sundberg, Årsta (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 14/835,550

(22) Filed: Aug. 25, 2015

(65) Prior Publication Data

US 2016/0056984 A1    Feb. 25, 2016

Related U.S. Application Data

(60) Provisional application No. 62/041,597, filed on Aug. 25, 2014.

(51) Int. Cl.
| | |
|---|---|
| *H04L 27/12* | (2006.01) |
| *H04L 27/20* | (2006.01) |
| *H04L 27/14* | (2006.01) |
| *H04L 27/22* | (2006.01) |

(52) U.S. Cl.
CPC .............. *H04L 27/20* (2013.01); *H04L 27/12* (2013.01); *H04L 27/14* (2013.01); *H04L 27/22* (2013.01)

(58) Field of Classification Search
CPC ......... H04L 27/20; H04L 27/12; H04L 27/14; H04L 27/22
See application file for complete search history.

(56) References Cited

U.S. PATENT DOCUMENTS

| 8,737,499 B2* | 5/2014 | Sikri ............. H04L 25/03012 370/208 |
| 2002/0168026 A1 | 11/2002 | Khoini-Poorfard |
| 2006/0072646 A1* | 4/2006 | Feher ...................... H04B 1/69 375/130 |

OTHER PUBLICATIONS

Vodafone Group Plc., GP-140418 (rev. of GP-140411), "New Study Item on Cellular System Support for Ultra Low Complexity and Low Throughput Internet of Things", 3GPP TSG-GERAN Meeting #62, Valencia, Spain, May 26-30, 2014, the whole document.
Vodafone Group Plc., GP-140421 (rev of GP-140418 rev of GP-140411), "New Study Item on Cellular System Support for Ultra Low Complexity and Low Throughput Internet of Things", 3GPP TSG-GERAN Meeting #62, Valencia, Spain, May 26-30, 2014, the whole document.
Nokia Networks, GP-140583, "Narrow Band Hybrid Modulation for Cellular IoT", 3GPP TSG GERAN#63, Ljubljana, Slovenia, Aug. 25-29, 2014, the whole document.

* cited by examiner

*Primary Examiner* — Jaison Joseph

(57) ABSTRACT

Techniques and apparatus are disclosed for multiplexing multiple Narrowband Hybrid Modulation sub-channels in the same radio channel. This is accomplished by applying symbol phase rotation and/or phase rotation of the modulated I/Q samples to at least one of two or more simultaneously transmitted Narrowband Hybrid Modulation bursts in the same GSM/GPRS radio frequency channel, in the same cell. Other embodiments of the techniques disclosed herein exploit this symbol/sample rotation approach to create orthogonal channels of Narrowband Hybrid Modulation bursts, on the same radio frequency channel. These orthogonal channels can be transmitted in different cells, to allow the use of the same GSM/GPRS radio frequency channel in multiple adjacent cells while at the same time minimizing inter-cell interference.

34 Claims, 8 Drawing Sheets

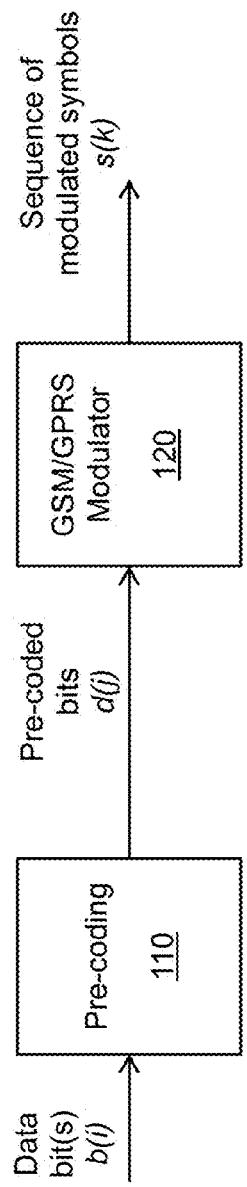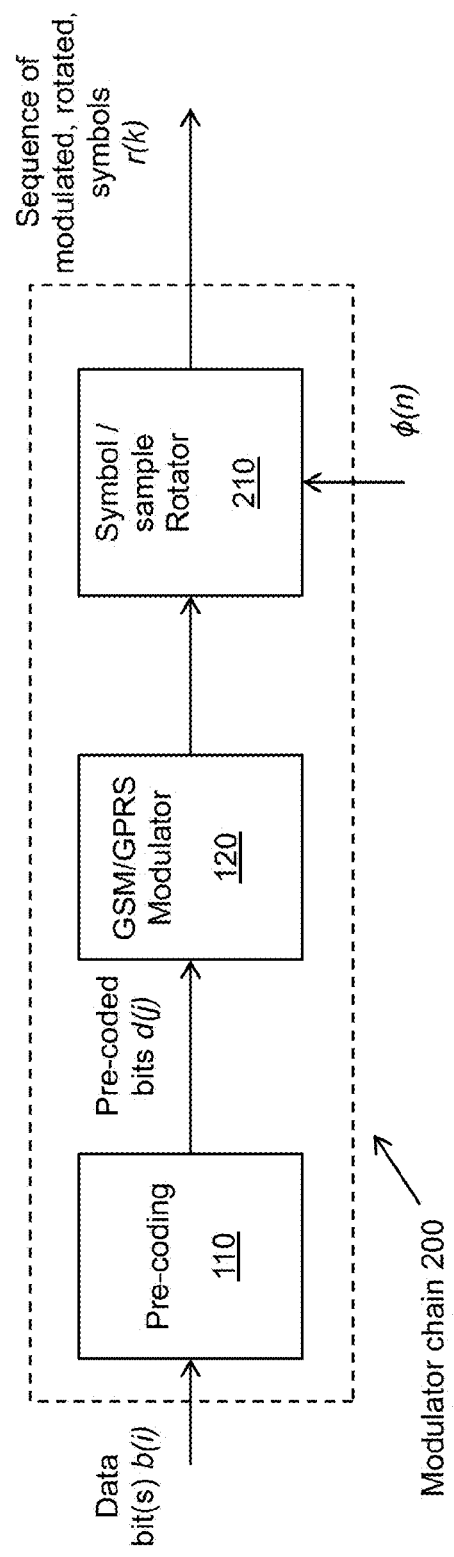

CAPACITY FOR NARROW-BAND HYBRID MODULATION

RELATED APPLICATION

The present application claims the benefit of U.S. provisional application Ser. No. 62/041,597, filed 25 Aug. 2014, the entire contents of which are hereby incorporated by reference.

TECHNICAL FIELD

The present disclosure is related to wireless communications device, and more particularly is related to data modulation techniques in such devices.

BACKGROUND

In recent years Machine-Type Communication (MTC) has attracted increasing interest from the mobile community. An example of this is the recently begun "*Study Item on Cellular System Support for Ultra Low Complexity and Low Throughput Internet of Things* (FS_IoT_LC)" in the GERAN working group of the $3^{rd}$-Generation Partnership Project, on providing cellular access for devices falling into the category of Internet of Things (IoT). This study item is described in the 3GGP work item description GP-140421, *"New Study Item on Cellular System Support for Ultra Low Complexity and Low Throughput Internet of Things* (FS_IoT_LC) (revision of GP-140418)", source VODAFONE Group Plc, available at http://http://www.3gpp.org/ftp/tsg_geran/TSG_GERAN/GERAN_62_Valencia/docs/GP-140421.zip. The focus of this study is to develop a solution that provides a high system capacity and improved coverage for equipment with low requirements on data rate and latency.

One of the proposals for a candidate solution in this study is the so-called Narrow Band Hybrid Modulation, as described in the 3GPP report GP-140583, *"Narrow Band Hybrid Modulation for Cellular Iot,"* source Nokia Networks, available at http://www.3gpp.org/ftp/tsg_geran/TSG-_GERAN/GERAN_63_Ljubljana/Docs/GP-140583.zip. The technique described in this report was subsequently renamed "Narrowband GSM," or "N-GSM," when discussed in the 3GPP Technical Report, *"Cellular System Support for Ulta Low Complexity and Low Throughput Internet of Things,"* 3GPP TR 45.820, v. 1.3.1, 12 May 2015, available at http://www.3gpp.org/DynaReport/45820.htm. In the discussion that follows, the terms "N-GSM" and "Narrow Band Hybrid Modulation" will be used interchangeably.

Narrow Band Hybrid Modulation or N-GSM, as described in the GP-140583 report, reuses the legacy GSM transmitter architecture, but with the addition of a pre-coding module inserted before the modulator. This is shown in FIG. 1, which illustrates pre-coding module 110 and a conventional GSM/GPRS modulator 120. Data bits b(i) are encoded by pre-coding module 110, which maps each data bit b(i) or, a group of data bits, to a multi-symbol pattern, which is then used as the input to GSM/GPRS modulator 120, which modulates a carrier frequency with the multi-symbol pattern, using Gaussian Minimum-Shift Keying (GMSK) or Phase-Shift Keying (PSK) modulation.

In its simplest realization, pre-coder module 110 maps each data bit onto an eight-bit bit-pattern that is sent to the modulator 120. When a GMSK modulation and coding scheme (MCS) is used, for example, the pre-coder module can map an input value of 0 to the repeated bit pattern "0000000," which will result in a narrow band signal, a tone, located at an offset around 68 kHz above the center frequency of the occupied radio channel. An input value of 1 can be mapped to the alternating bit pattern "10101010," which will result in a tone located at an offset around 68 kilohertz (kHz) below the center frequency of the occupied radio channel.

The GP-140583 report discussed above provides additional details for various precoding options, such that one to three data bits can be mapped to 8-symbol sequences supplied to a GSM/GPRS modulator, where seven 8-symbol sequences can be transmitted within a conventional GSM/GPRS burst. As shown in the report, the simple mapping example provided above can be extended to 8PSK modulation, in which case each possible combination of three input data bits is mapped to one of 8 different tones, each of which, because of the length of the multi-symbol pattern supplied to modulator 120, occupies only a small part of the bandwidth of the 200-kHz GSM channel at any given time.

At the receiver side, all a device must do to demodulate a N-GSM signal formed in this matter is to detect which tones in the targeted channel were received, e.g., using a simple Fast Fourier Transform. In addition, information might be carried in the phase/amplitude of the signal, but this example is limited to information transmitted only by different tones. The receiver can then map the detected tones to data bits. This new concept is claimed to be of reasonable computational complexity and to provide the level of coverage and the bit rates required by the FS_IoT_LC study.

The N-GSM solution described above, however, will suffer from low spectral efficiency, leading to reduced system capacity since the technique during transmission only occupy parts of the available GSM/GPRS channel bandwidth. Compared to the GSM/GPRS legacy symbol rate of 270 kHz, this new solution will, at any given instant, only occupy fractions of the GSM/GPRS 200-kHz channel bandwidth. Since the study item discussed above has a clear focus on providing good system capacity, this is a drawback in terms of resource utilization.

SUMMARY

As noted above, compared to the GSM/GPRS legacy symbol rate of 270 kHz, the Narrow Band Hybrid Modulation approach described in the GP-140583 report will only occupy fractions of the GSM/GPRS channel bandwidth. Since the same GSM/GPRS channel is not used by any other device in the same cell, the majority of the spectral resources in that channel will be "empty." In an interference-limited scenario, the empty resources will, to some extent, reduce the interference level, but in a sensitivity scenario this leads to a sub-optimal use of available resources.

Embodiments of the present invention address this wastefulness by providing for the possibility to multiplex multiple data streams in a single radio channel, where each data stream is transmitted in the channel using the Narrow Band Hybrid Modulation approach described above, or a variant thereof. In some embodiments the multiple data streams may correspond to different receiver devices. Other embodiments provide for the creation of orthogonal channels, occupying the same radio frequency channel, which can be transmitted in different cells.

An example method according to some embodiments is suitable for implementing in a radio transmitting device, such as a base station or wireless device. The example method includes generating a first stream of modulation symbols for a first stream of data bits, by successively precoding each data bit or group of data bits in the first stream of data bits. This precoding comprises mapping each data bit or group of data bits to a corresponding one of a set of predetermined N-symbol sequences according to the value of the data bit or group of data bits. These predetermined N-symbol sequences are selected so that each N-symbol sequence, when fed into a legacy GMSK or 8PSK modulator, yields an output corresponding to a tone out of a predetermined set of tones falling within a predetermined bandwidth, the tone occupying only a fraction of the predetermined bandwidth. The example method further includes generating a second stream of N-symbol sequences for a second stream of data bits, again by successively precoding each data bit or group of data bits in the second stream of data bits. Again, this precoding comprises mapping each data bit or group of data bits to a corresponding one of the set of predetermined N-symbol sequences according to the value of the data bit or group of data bits.

The example method further includes modulating a carrier signal with the first and second streams of modulation symbols, using Gaussian Minimum-Shift Keying (GMSK) or Phase-Shift Keying (PSK) modulation, so that tones corresponding to the first and second streams of data bits simultaneously occupy a fraction of a predetermined frequency range corresponding to the predetermined bandwidth. This modulating operation comprises rotating modulation symbols in at least one of the streams of modulation symbols or rotating the corresponding I/Q samples such that the resulting modulated symbols for the first stream have a different rotation angle than the modulated symbols for the second stream. In some embodiments, the method further comprises transmitting the modulated carrier signal, to one or more receiving wireless devices.

Another example method is also suitable for implementation in a radio transmitter device, such as a base station. In this example method, the modified N-GSM modulation techniques described herein are used to create multiple carrier signals, e.g., for transmission in multiple cells, where the carrier signals are orthogonal to one another despite occupying the same radio channel.

This example method includes generating a first stream of modulation symbols, for a first stream of data bits, by successively precoding each data bit or group of data bits. This precoding comprises mapping each data bit or group of data bits in the first stream to a corresponding one of a set of predetermined N-symbol sequences according to the value of the data bit or group of data bits. The first and second predetermined N-symbol sequences are again selected so that each N-symbol sequence, when fed into a legacy GMSK or 8PSK modulator, yields an output corresponding to a tone out of a predetermined set of tones falling within a predetermined bandwidth, the tone occupying only a fraction of the predetermined bandwidth.

The example method further includes generating a second stream of modulation symbols for a second stream of data bits, again by successively precoding each data bit or group of data bits. Again, this precoding comprises mapping each data bit or group of data bits in the second stream to a corresponding one of the set of predetermined N-symbol sequences according to the value of the data bit or group of data bits. The method further comprises modulating a first carrier signal with the first stream of modulation symbols, using Gaussian Minimum-Shift Keying (GMSK) or Phase-Shift Keying (PSK) modulation, so that tones resulting from said modulating occupy a first predetermined frequency range of the modulated first carrier signal, and modulating a second carrier signal with the second stream of modulation symbols, using GMSK or PSK modulation, so that tones resulting from modulating the second carrier signal with the second stream of modulation symbols also occupy the first predetermined frequency range. The modulating of the first and second carrier signals comprises rotating modulation symbols in at least one of the streams of modulation symbols or corresponding I/Q samples, such that the resulting modulated symbols on the modulated first carrier signal have a different rotation angle than the modulated symbols on the modulated second carrier signal. The example method still further comprises simultaneously transmitting the modulated first and second carrier signals; in some embodiments this may comprise transmitting the modulated first and second carrier signals in first and second cells, respectively, of a radio communications network.

Another example method according to embodiments of the present invention is suitable for implementation in a radio receiver device, whether a base station or a wireless device, and is for de-multiplexing a data stream from a single radio channel in a received signal. The method includes identifying a first set of predetermined frequency tones, based on a first modulation rotation angle for a first data stream. The method further includes performing a first Fast Fourier Transform (FFT) over a first interval of time, wherein the first interval comprises a plurality of Gaussian Minimum-Shift Keying or Phase-Shift Keying (PSK) modulation intervals in the received signal. The method further includes detecting a first frequency tone, based on the FFT. A first transmitted data bit or group of data bits corresponding to the first frequency tone is then identified, based on a predetermined mapping between each of the predetermined frequency tones of the first set and a corresponding bit or group of data bits.

Extensions and variations of the methods summarized above are described in detail below, as are corresponding apparatuses for carrying out these methods.

BRIEF DESCRIPTION OF THE FIGURES

FIG. 1 illustrates a Narrowband Hybrid Modulator.

FIG. 2 illustrates a modulator chain according to embodiments of the present invention.

DETAILED DESCRIPTION

Figure 3A:
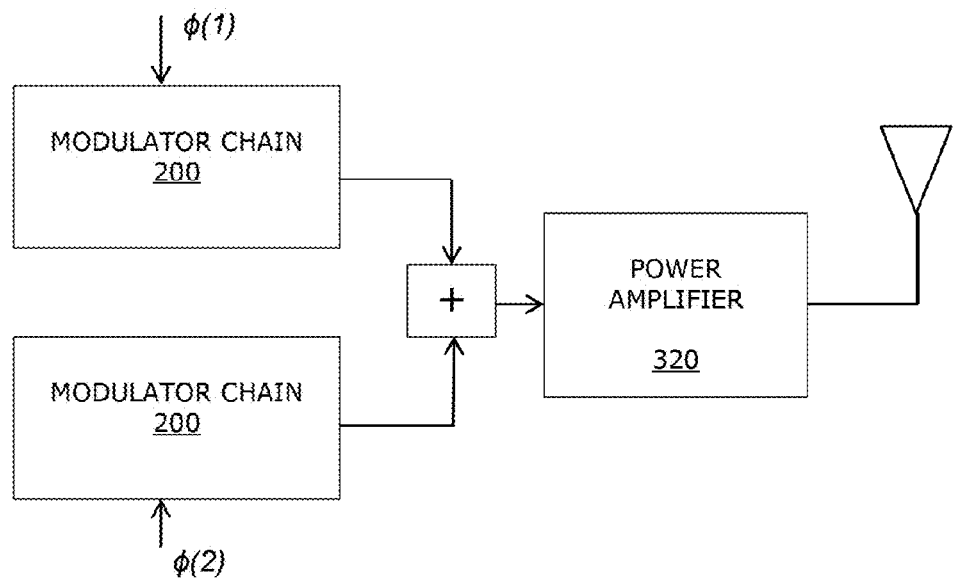
FIGS. 3A and 3B illustrate example implementations of multiple modulator chains.

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes.

Some or all of the functions described may be implemented using hardware circuitry, such as analog and/or discrete logic gates interconnected to perform a specialized function, application-specific integrated circuits (ASICs), programmable logic arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry, including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

References throughout the specification to "one embodiment" or "an embodiment" mean that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

In some of the embodiments described herein, the non-limiting terms "user equipment" and "UE" are used. A UE, as that term is used herein, can be any type of wireless device capable of communicating with a network node or another UE over radio signals, including an MTC device or M2M device. A UE may also be referred to as a radio communication device, or a target device, and the term is intended to include device-to-device UEs, machine-type UEs or UEs capable of machine-to-machine communication, sensors equipped with a UE, wireless-enabled table computers, mobile terminals, smart phones, laptop-embedded equipped (LEE), laptop-mounted equipment (LME), USB dongles, wireless customer-premises equipment (CPE), etc.

The Narrow Band Hybrid Modulation approach described in the GP-140583 report will only occupy fractions of the GSM/GPRS channel bandwidth. Since the same GSM/GPRS channel is not used by any other device in the same cell, the majority of the spectral resources in that channel will be "empty." In an interference-limited scenario, the empty resources will to some extent reduce the interference level, but in a sensitivity scenario this leads to a sub-optimal use of available resources. Since the work in the 3GPP study item discussed above has a clear focus on both improving coverage and supporting very large volumes of devices, this inefficiency in terms of resource utilization is a significant drawback.

Some embodiments of the techniques disclosed herein address this problem by providing for the multiplexing of multiple N-GSM signals in the same GSM/GPRS radio frequency channel. This is accomplished by applying symbol phase rotation and/or phase rotation of the modulated I/Q samples to at least one of two or more simultaneously transmitted N-GSM bursts in the same GSM/GPRS radio frequency channel, in the same cell.

Other embodiments of the techniques disclosed herein exploit this symbol/sample rotation approach to create orthogonal channels of N-GSM bursts, i.e., multiple orthogonal N-GSM sub-channels, in the same GSM/GPRS radio frequency channel. These orthogonal channels can be transmitted in different cells, to allow the use of the same GSM/GPRS radio frequency channel in multiple adjacent cells while at the same time minimizing inter-cell interference.

Since a phase rotation in the time domain corresponds to a shift in the frequency domain, a set of orthogonal sub-channels, each using N-GSM modulation, can be created within a GSM/GPRS channel by associating each sub-channel with a unique rotation. If it is assumed, for example, that a simple Narrow Band Hybrid Modulator creates two tones of bandwidth X kHz located at around ±68 kHz, as discussed above, then multiple orthogonal sub-channels can be defined by symbol rotations and/or I/Q sample rotation corresponding to frequency shifts of, for example, 0 Hz, −X kHz and +X kHz. Assigning these rotations to three different devices would then facilitate orthogonal multiplexing, in the frequency domain, of the three devices on a single GSM/GPRS radio frequency channel, effectively providing a tripling of channel throughput.

The capacity of the network can also be increased if the same GSM/GPRS radio frequency channel is used in multiple cells, but with each cell using a cell specific rotation, effectively creating a higher frequency re-use pattern within the GSM/GPRS radio frequency channel.

For both techniques, i.e., whether the techniques described herein are used for multiplexing multiple users or multiple user data sub-channels in the same GSM/GPRS radio frequency channel or for creating orthogonal sub-channels to be transmitted from multiple cells, the receiving device needs to know the sub-channel or, equivalently, the rotation angle, for the N-GSM signal intended for it. Thus, an indicator of the sub-channel or of the rotation angle corresponding to a specific frequency shift, compared to the non-rotated sequence, is signaled from the network to the device, in some embodiments.

In some embodiments, the sub-channel for a given user may be changed with time, such that the signal transmitted to a given device will at a first time instance use one sub-channel and at a second time instance use a different one. This approach can be used to achieve diversity in the transmissions, to combat a situation where, for example, a receiving mobile station experiences a very deep fade in the channel at a specific sub-channel location. In some embodiments according to this approach, the time interval between changing the sub-channel for a user is chosen to be equal to the normal burst duration in GSM/EDGE.

An indication of a pattern for changing the sub-channel may be transmitted to the receiving device, in some embodiments. In some embodiments, for instance, the time variant allocation of sub-channels, i.e., the sequence of how the sub-channel allocation changes with time, is pre-defined in a pseudo-random manner, so that the network can assign a specific time variant pattern by indication of an index, for example 'time pattern 3', in which case both the device and the network can pre-determine the sub-channel allocation at each instance in time.

Figure 3B:
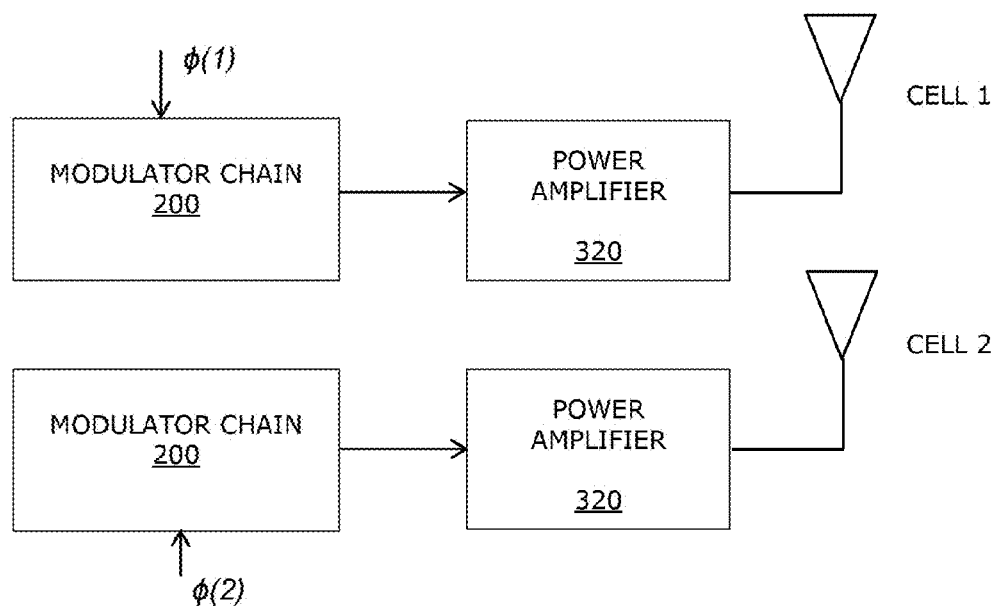

FIG. 2 is a block diagram illustrating an example modulator chain 200, implementing the modified N-GSM modulation approach described above at baseband. As seen in FIG. 2, the pre-coder 110 and modulator 120 are followed by a symbol/sample rotator 210, which rotates the modulated symbols, or modulated samples, s(k) from the modulator according to the rotation angle $\phi(n)$ allocated to the sub-channel at issue. Note that FIG. 2 illustrates the modulation of only a single sub-channel. Multiple instances of the illustrated modulator chain can operate in parallel, with each using a different rotation angle $\phi(n)$. As shown in FIG. 3A, for example, the outputs of two (or more) modulator chains 200 like those shown in FIG. 3, where different rotation angles $\phi(1)$ and $\phi(2)$ are used in the different modulator chains 200, can be combined, prior to amplification in power amplifier 320 (and, in some embodiments, prior to upconversion of the modulated signal to the appropriate frequency), for multiplexing multiple sub-channels in the same GSM/GPRS channel. Alternatively, as shown in FIG. 3B, the outputs of two different modulator chains 200, again using different rotation angles $\phi(1)$ and $\phi(2)$, can be transmitted in different cells so that the transmissions are orthogonal to one another, reducing inter-cell interference. Note that either $\phi(1)$ or $\phi(2)$ can be zero, in some instances or embodiments, meaning that the modulated symbols in the corresponding sub-channel are not rotated.

It will be appreciated that the modulator chain 200 shown in FIG. 2 is a simplified view of a baseband implementation. The precoding 110, GSM/GPRS modulator 120, and symbol rotator 210 may be implemented, in some embodiments, in a digital signal processing circuit that includes one or more specialized digital signal processors (DSPs) and/or one or more microprocessors or microcontrollers, in some cases in combination with specialized digital logic. A digital signal processing circuit that implements all or part of modulator chain 200 may further comprise one or more memory devices that store program instructions for execution by the DSP(s), microprocessor(s), and/or microcontroller(s). These one or more memory devices, which may comprise various combinations of read-only memory (ROM), flash memory, and random-access memory (RAM), for example, may also store configuration data, program data, etc.

In the illustrated example, the modulated symbols from modulator 120 are rotated, according to a rotation angle $\phi(n)$. It will be appreciated that in some embodiments, the rotation of the modulated symbols may be accomplished by rotating the samples applied to the in-phase (I) and quadrature (Q) inputs of an IQ modulator. These approaches are equivalent to each other, and each provides for the creation of orthogonal channels or sub-channels when different rotation angles $\phi(n)$ are used. As noted above, in some embodiments the rotation angle $\phi(n)$ for a given sub-channel may change from one time interval to another, e.g., to provide a degree of frequency diversity in the transmitted signal.

Figure 4:
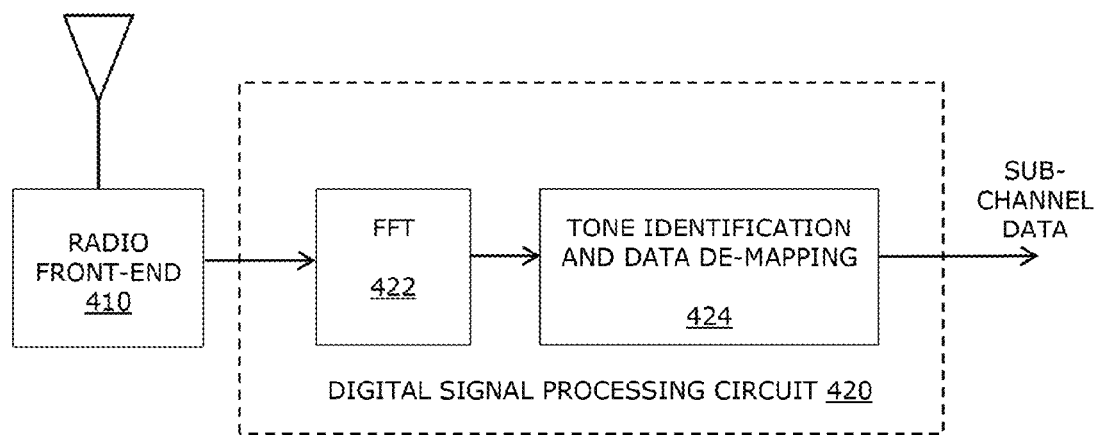
FIG. 4 is a block diagram illustrating components of an example radio receiver device according to some embodiments of the present invention.

FIG. 4 illustrates an example receiver device 400 for receiving an N-GSM sub-channel signal formed in the manner described above. Receiver device 400 comprises a radio-front end circuit 410, which performs low-noise amplification, filtering, downconversion and channel selection, and digital-to-analog conversion, according to approaches conventionally used in GSM receivers or wireless receivers for other wireless standards. The digitized samples from radio front-end circuit 410, which correspond in some embodiments to a digitized representation of the signal received in a single GSM/GPRS channel, are input to a digital signal processing circuit 420. Digital signal processing circuit 420 comprise one or more specialized digital signal processors (DSPs) and/or one or more microprocessors or microcontrollers, in some cases in combination with specialized digital logic. Digital signal processing circuit 420 may further comprise one or more memory devices that store program instructions for execution by the DSP(s), microprocessor(s), and/or microcontroller(s). These one or more memory devices, which may comprise various combinations of read-only memory (ROM), flash memory, and random-access memory (RAM), for example, may also store configuration data, program data, etc. In some embodiments, the digital signal processing circuit 420 may be configured, with appropriate program code, to implement a wireless telecommunications protocol stack, such as the GSM/GPRS protocol stack, and may in some embodiments be further configured to provide user interface functionality and/or to carry out one or more applications using data sent and/or received over the wireless link, such as an MTC device application.

In particular, digital signal processing circuit 420, in some embodiments, is configured, with a processor and corresponding program code or with digital hardware, or with a combination of both, to carry out an FFT operation on the digital samples corresponding to a single radio channel (e.g., a single 200-kHz GSM) channel. This is shown in FIG. 4 with FFT circuit 422. In an example implementation the length of the FFT operation corresponds to at least the length of the N-symbol sequence to which the user data has been mapped. Thus, for example, the length of the FFT operation may correspond to the length of 8 GSM/GPRS symbols, in embodiments where each user data bit or group of data bits has been mapped to an 8-symbol pattern in the precoding operation described above. The resolution of the FFT output will depend on the sample rate, but need only be fine enough to distinguish between the number of different tones that are expected, given the particular N-GSM technique used and the number of multiplexed or orthogonal channels. In a simple scheme, for example, each input data bit is mapped to one of two possible 8-bit patterns, and three sub-channels are multiplexed in a GSM/GPRS radio frequency channel. In this scheme, a first sub-channel may have tones at +/−68 kHz, a second sub-channel may have tones at −51 kHz and +85 kHz, and a third sub-channel may have tones at −85 kHz and +51 kHz.

The digital signal processing circuit 420 further comprises a tone identification and data de-mapping circuit 424, which simply takes the output of FFT 422 and determines which tone appears in each N-symbol interval of the received signal, e.g., by determining which FFT output bin has the highest amplitude. The tone is then de-mapped to a corresponding sub-channel data bit or group of data bits, according to a predetermined correspondence between the tones and data bits or groups of data bits. Tone identification and data de-mapping circuit 424 may be implemented in digital hardware, in some embodiments, but more typically will be implemented in a programmed processor, in conjunction with the FFT 422.

Although described above in the context of a GSM/GPRS network, the techniques described above can be implemented in any appropriate type of telecommunication system, supporting any suitable communication standards and using any suitable components. Generally, particular embodiments of the described solutions may be implemented in a network, such as the wireless network 500 illustrated in FIG. 5, which comprises radio access network 510, base stations, 520, and mobile stations 530. It will be appreciated that modulator chains like the modulator chains 200 shown in FIG. 2 may be used in base stations 520 for downlink transmissions, in some embodiments, and/or in the mobile stations 530 for uplink transmissions in others. Further, it should be noted that while mobile stations 530, which may be referred to in various contexts as user equipment (UEs), mobile devices, and the like, are illustrated in the example shown in FIG. 5, the techniques described herein are applicable to wireless devices of a wide variety of types, and may be of particular use in the context of Machine-Type Communication (MTC) devices or Machine-to-Machine (M2M) devices, some of which may be simplified wireless devices that, in some cases, may not be "mobile" at all, i.e., installed in fixed locations.

Figure 5:
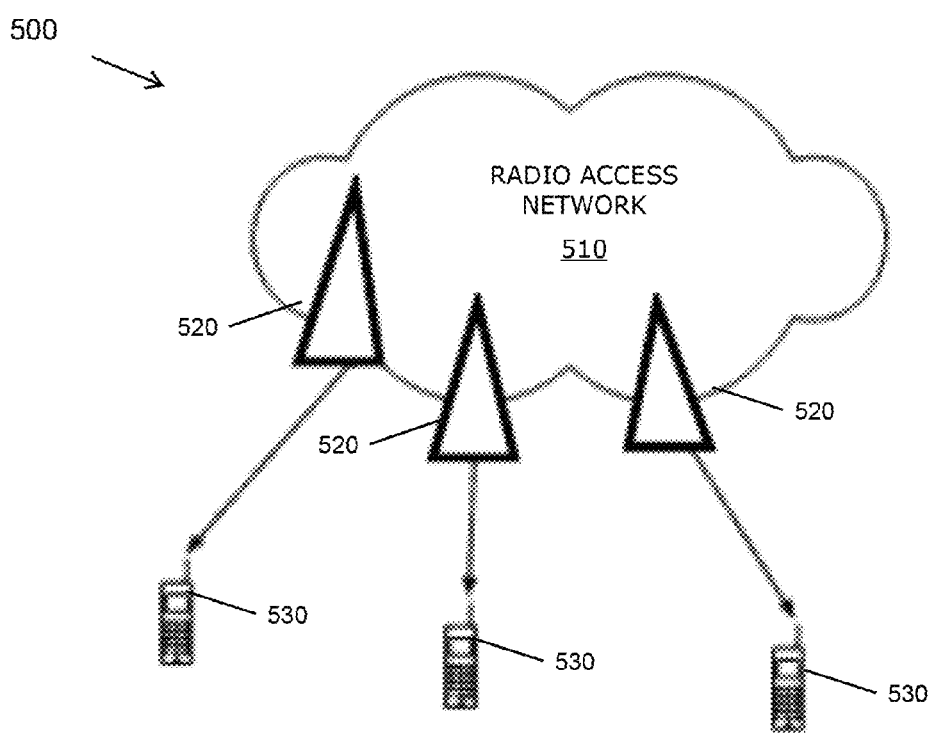
FIG. 5 shows an example network in which the presently disclosed techniques and apparatuses may be employed.

As shown in FIG. 5, an example network in which the presently disclosed techniques are employed may include one or more instances of user equipment (UEs) or other wireless devices, and one or more base stations capable of communicating with these wireless devices, along with any additional elements suitable to support communication between wireless devices or between a wireless device and another communication device, such as a landline telephone or a data server. Although the illustrated mobile stations 530 may represent wireless devices that include any suitable combination of hardware and/or software, these wireless devices may, in particular embodiments, represent devices such as the example wireless illustrated in greater detail by FIG. 6. Similarly, although the illustrated base stations may represent network nodes that include any suitable combination of hardware and/or software, these base stations may, in particular embodiments, represent devices such as the example base station illustrated in greater detail by FIG. 7.

Figure 6:
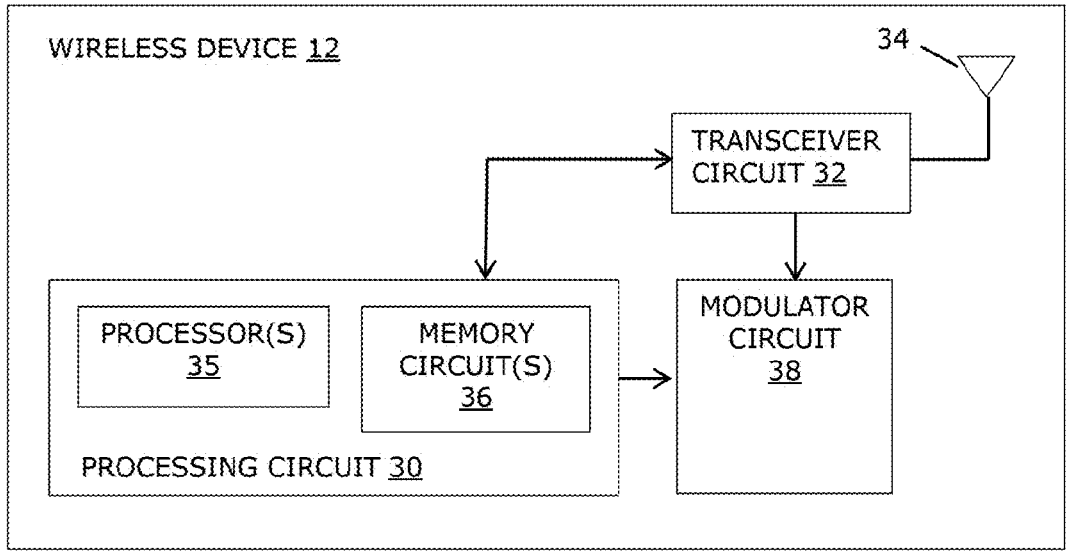
FIG. 6 is a block diagram illustrating an example wireless device.

As shown in FIG. 6, the example wireless device includes a processing circuit 30 that controls the operation of the wireless device 12. The processing circuit 30 includes one or more processors 35, which may comprise one or more microprocessors, microcontrollers, digital signal processors, specialized digital logic, etc., and also comprises a memory circuit 36 that is connected to the processors 35 and that stores program code and other information and data required for the operation of the wireless device 12. Processing circuit 30 is connected to and controls a transceiver circuit 32 with associated antenna(s) 34, which are used to receive signals from and/or to transmit signals to a base station 10. The example wireless device 12 further comprises a modulator circuit 38, which is operatively coupled to the processing circuit 30 and the transceiver circuit 32, and which may comprise digital logic, analog circuit, or a combination of both. It will be appreciated that while modulator circuit 38 is shown as distinct from processing circuit 30 in the illustrated example, modulator circuit 38 may share digital logic, and/or processing logic with processor circuit 30, in some embodiments. Together, the processing circuit 30 and modulator circuit 38 are adapted, in various embodiments and as described in further detail below, to carry out one or more of the techniques described herein. In particular embodiments, some or all of the functionality described herein as being provided by wireless devices may be provided by a wireless device processor executing instructions stored on a computer-readable medium, such as the memory circuit 36 shown in FIG. 6. Alternative embodiments of the wireless device may include additional components beyond those shown in FIG. 6 that may be responsible for providing certain aspects of the wireless device's functionality, including any of the functionality described above and in conjunction with the process flows of FIGS. 8-11 as described below, and/or any functionality necessary to support the solutions described herein.

Figure 7:
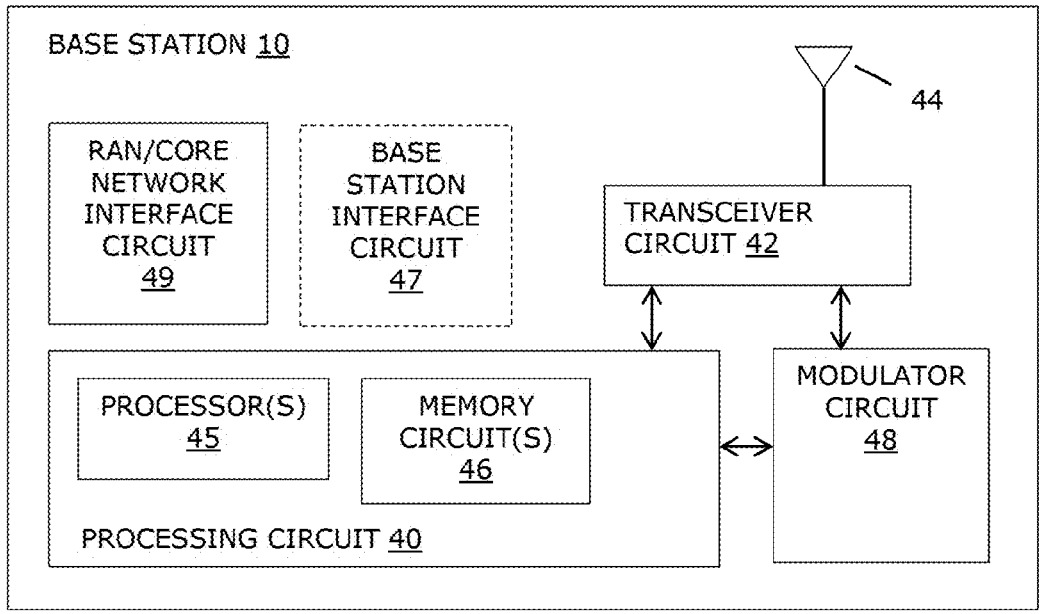
FIG. 7 is a block diagram illustrating an example base station.

FIG. 7 shows a base station 10 (which may be referred to, for example, as a BTS, NodeB or an eNodeB) that can be used in example embodiments described. It will be appreciated that although a macro base station will not in practice be identical in size and structure to a micro, pico, or femto base station, these different examples of base station 10 will generally include similar or corresponding components, although the details of each of those components may vary to accommodate the different operational requirements of a particular embodiment.

The illustrated base station 10 comprises a processing circuit 40 that controls the operation of the base station 10. The processing module 40 includes one or processors 45, which may comprise one or more microprocessors, microcontrollers, digital signal processors, specialized digital logic, etc., and also includes a memory circuit 46 that is connected to the processing module 40 and that stores program and other information and data required for the operation of the base station 10. Processing circuit 40 is connected to and controls a transceiver module 42 with associated antenna(s) 44, which are used to transmit signals to, and receive signals from, wireless devices 12 in the network. The example base station 10 further comprises a modulator circuit 48, which is operatively coupled to the processing circuit 40 and the transceiver circuit 42, and which may comprise digital logic, analog circuit, or a combination of both. It will again be appreciated that while modulator circuit 48 is shown as distinct from processing circuit 40 in the illustrated example, modulator circuit 48 may share digital logic, and/or processing logic with processor circuit 40, in some embodiments. Together, the processing circuit 40 and modulator circuit 48 are adapted, in various embodiments and as described in further detail below, to carry out one or more of the network-based techniques described below.

In some embodiments, base station 10 may also include components and/or circuitry 47 for allowing the base station 10 to exchange information with other base stations 10 (for example, via an interface defined by the appropriate wireless network standards) and components and/or circuitry 49 for allowing the base station 10 to exchange information with nodes in a core network (again, for example, via an interface defined by wireless network standards) or with other nodes in the radio access network (RAN), such as a base station controller (BSC). It will be appreciated that base stations for use in various types of network (e.g., GSM/GPRS, E-UTRAN or WCDMA RAN) will include similar components to those shown in FIG. 7 and appropriate interface circuitry 47, 49 for enabling communications with the other network nodes in those types of networks (e.g., for communications with other base stations, mobility management nodes and/or nodes in the core network). In particular embodiments, some or all of the functionality described herein as being provided by a base station may be provided by a base station processor executing instructions stored on a computer-readable medium, such as the memory shown in FIG. 7. Alternative embodiments of the base station may include additional components responsible for providing additional functionality, including any of the functionality described above and in conjunction with the process flows of FIGS. 8-10 as described below, and/or any functionality necessary to support the solutions described herein.

In view of the detailed example embodiments described above, it will be appreciated that FIG. 8 is a process flow diagram illustrating a method for multiplexing multiple data streams for transmission in a single radio channel, as carried out in a radio transmitter device for at least a first interval of time. It should be appreciated that the illustrated method may be carried out in a base station or in a wireless device, such as a UE or MTC device.

The illustrated method includes, as shown at block 820, generating a first stream of modulation symbols for a first stream of data bits, by successively precoding each data bit or group of data bits in the first stream of data bits. This precoding comprises mapping each data bit or group of data bits to a corresponding one of a set of predetermined N-symbol sequences according to the value of the data bit or group of data bits. These predetermined N-symbol sequences are selected so that each N-symbol sequence, when fed into a legacy GMSK or 8PSK modulator, yields an output corresponding to a tone out of a predetermined set of tones falling within a predetermined bandwidth, the tone occupying only a fraction of the predetermined bandwidth. This predetermined bandwidth may be 200 kHz, for example, in a GSM/GPRS system. The illustrated method further includes, as shown at block 830, generating a second stream of N-symbol sequences for a second stream of data bits, again by successively precoding each data bit or group of data bits in the second stream of data bits. Again, this precoding comprises mapping each data bit or group of data bits to a corresponding one of the set of predetermined N-symbol sequences according to the value of the data bit or group of data bits. Note that the operations shown in blocks 820 and 830 may be carried out in any order, but may typically be carried out simultaneously.

As shown at block 840, the illustrated method further includes modulating a carrier signal with the first and second streams of modulation symbols, using Gaussian Minimum-Shift Keying (GMSK) or Phase-Shift Keying (PSK) modulation, so that tones corresponding to the first and second streams of data bits simultaneously occupy a fraction of a predetermined frequency range corresponding to the predetermined bandwidth. In a GSM/GPRS system, for example, this predetermined frequency range corresponds to one of the predefined GSM/GPRS radio channels. This modulating operation comprises rotating modulation symbols in at least one of the streams of modulation symbols or corresponding I/Q samples such that the resulting modulated symbols for the first stream have a different rotation angle than the modulated symbols for the second stream. In some embodiments, as shown at block 870, the method further comprises transmitting the modulated carrier signal, to one or more receivers.

The operations illustrated in blocks 820, 830, and 850 correspond to the multiplexing of two sub-channels in a single radio frequency channel (such as a GSM/GPRS channel). As noted above, the same techniques may be extended to the multiplexing of three or more channels, in some embodiments. Accordingly, block 840 illustrates generating a third stream of modulation symbols from a third stream of data bits by successively precoding each data bit or group of data bits in the third stream of data bits. Again, said precoding comprises mapping each data bit or group of data bits to a corresponding one of the set of predetermined N-symbol sequences according to the value of the data bit or group of data bits. As shown at block 860, the carrier signal is further modulated with the third stream of modulation symbols, using GMSK or PSK modulation, so that tones resulting from modulating the carrier signal with the third stream of modulation symbols occupy fractions of a predetermined frequency range corresponding to the predetermined bandwidth, simultaneously with the tones for the first and second streams of data bits but distinct from the fractions occupied by the tones for the first and second streams of data bits. This modulating operation comprises rotating modulation symbols in the third stream of modulation symbols or corresponding I/Q samples such that the resulting modulated symbols for the third stream have a different rotation angle than either of the modulated symbols for the second stream and the modulated symbols for the first stream. Blocks 850 and 860 are shown with dashed outlines, to indicate that these operations may not be present in every embodiment or instance of the illustrated method.

Furthermore, it was explained above that the rotation angle for a given sub-channel may change from time to time. Thus, it will be appreciated that the operations shown in blocks 820-860 may be repeated in each of one or more additional intervals of time. In a second interval of time, for example, the first and second streams of modulation symbols continue to be generated in the same manner illustrated in blocks 820 and 830, and the modulating of the carrier signal with the resulting first and second streams of modulation symbols is continued, as shown at block 840. However, in the second time interval, this modulating operation may comprise rotating modulation symbols in at least one of the streams of modulation symbols or corresponding I/Q samples such that the resulting modulated symbols for the first stream have a different rotation angle than the modulated symbols for the second stream and have a different rotation angle than the modulated symbols for the first stream have for the first time interval. In any of the variations discussed above, the first and/or second intervals of time may each have a duration equal to that of a normal burst duration in a GSM system.

It will be appreciated that the receiving device needs to know which sub-channel is intended for it. Accordingly, the method shown in FIG. 8 may comprise transmitting, to at least one receiving device, an indication of the rotation angle for at least one of the first and second streams of modulation symbols. It will be appreciated that this indication may directly indicate the rotation angle, in some embodiments, or indirectly, e.g., by indicating a sub-channel number or rotation angle pattern, in others. This is shown at block 810, which is also shown with a dashed outline, to indicate that these operations may not be present in every embodiment or instance of the illustrated method.

Figure 8:
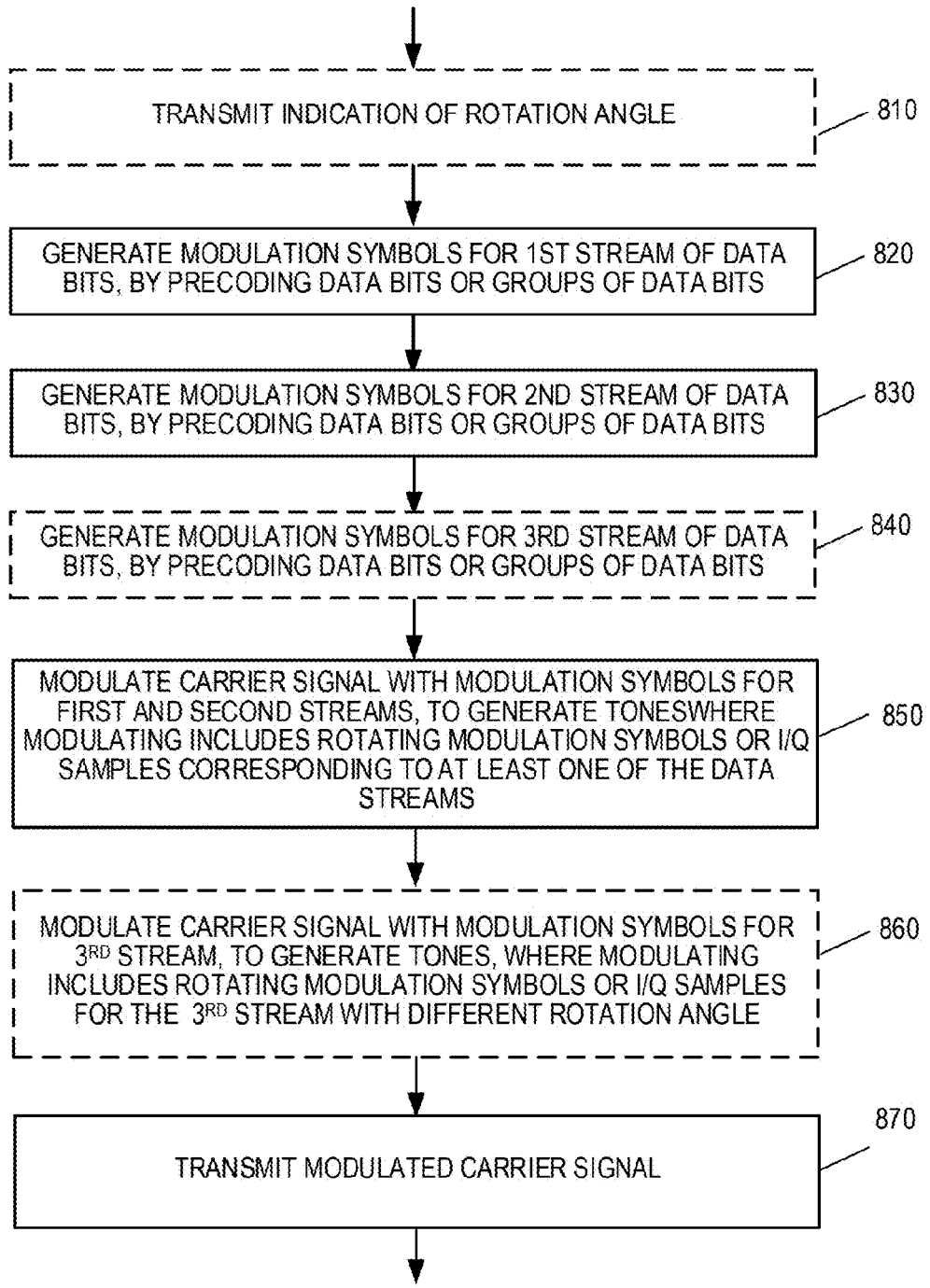
FIG. 8 is a process flow diagram illustrating an example method according to some embodiments of the present invention.
Figure 9:
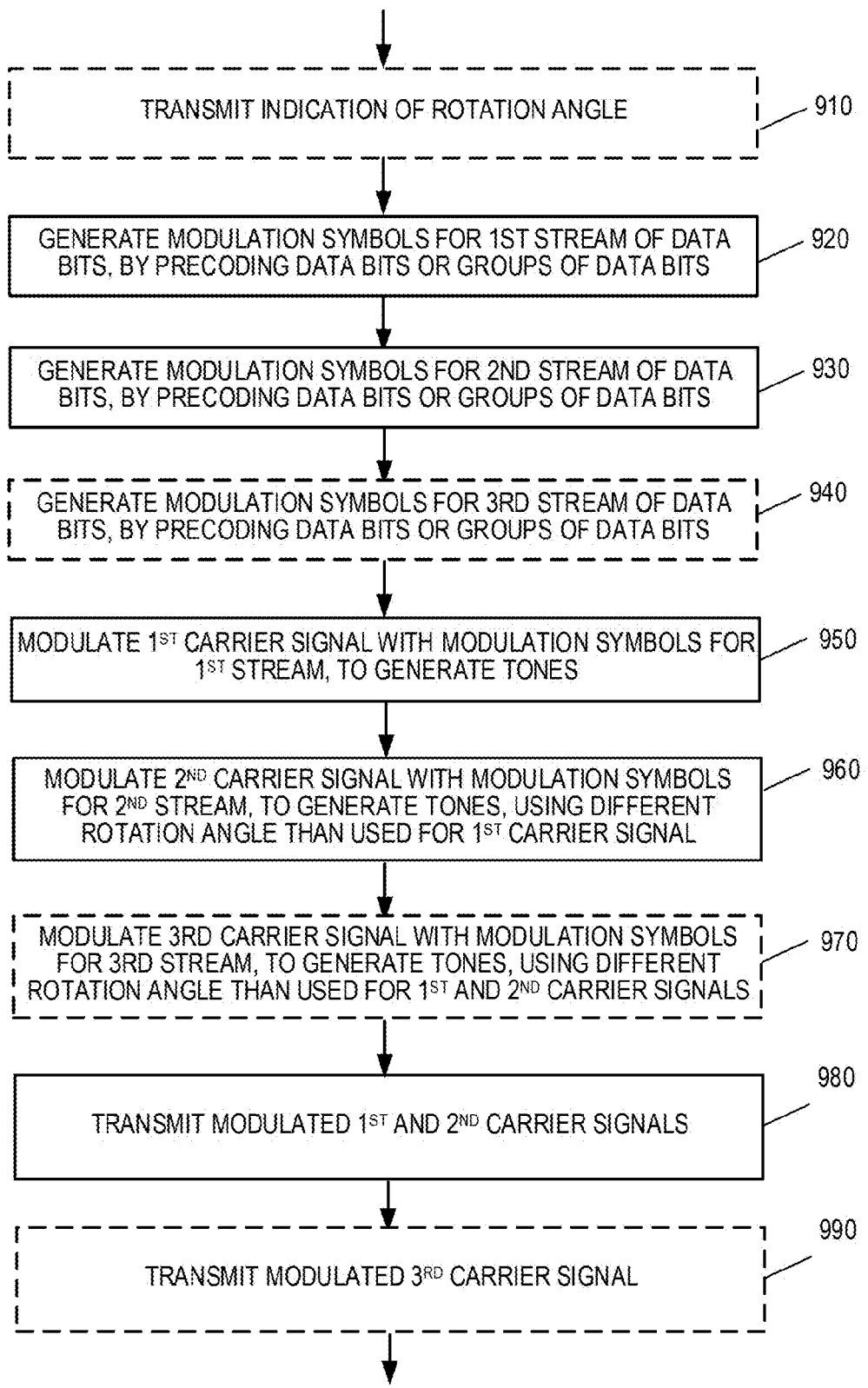
FIG. 9 is a process flow diagram illustrating another example method according to some embodiments of the present invention.

While FIG. 8 illustrates a method in which multiple sub-channels are multiplexed in a GSM/EDGE single radio frequency channel, FIG. 9 illustrates a variation in which the modified N-GSM modulation techniques described herein are used to create multiple carrier signals, e.g., for transmission in multiple cells, where the sub-channels are orthogonal to one another despite occupying the same GSM/EDGE radio channel. As discussed above, this technique may be used to improve frequency re-use and/or to reduce inter-cell interference between adjacent or nearby cells.

The method shown in FIG. 9 may be carried out in one or several radio transmitter devices, such as in multiple base stations 10, and is for at least a first interval of time. As shown at block 920, the illustrated method includes generating a first stream of modulation symbols, for a first stream of data bits, by successively precoding each data bit or group of data bits. This precoding comprises mapping each data bit or group of data bits in the first stream to a corresponding one of a set of predetermined N-symbol sequences according to the value of the data bit or group of data bits. As was the case with the technique illustrated in FIG. 8, the first and second predetermined N-symbol sequences are selected so that each N-symbol sequence, when fed into a legacy GMSK or 8PSK modulator, yields an output corresponding to a tone out of a predetermined set of tones falling within a predetermined bandwidth, the tone occupying only a fraction of the predetermined bandwidth.

As shown at block 930, the illustrated method further includes generating a second stream of modulation symbols for a second stream of data bits, again by successively precoding each data bit or group of data bits. Again, this precoding comprises mapping each data bit or group of data bits in the second stream to a corresponding one of the set of predetermined N-symbol sequences according to the value of the data bit or group of data bits.

As shown at block 950, the method further comprises modulating a first carrier signal with the first stream of modulation symbols, using Gaussian Minimum-Shift Keying (GMSK) or Phase-Shift Keying (PSK) modulation, so that tones resulting from said modulating occupy a first channel of the modulated first carrier signal. As shown at block 960, a second carrier signal is modulated with the second stream of modulation symbols, using GMSK or PSK modulation, so that tones resulting from modulating the second carrier signal with the second stream of modulation symbols also occupy the first channel. The modulating of the first and second carrier signals comprises rotating modulation symbols in at least one of the streams of modulation symbols or corresponding I/Q samples, such that the resulting modulated symbols on the modulated first carrier signal have a different rotation angle than the modulated symbols on the modulated second carrier signal. As shown at block 980, the method further comprises simultaneously transmitting the modulated first and second carrier signals; in some embodiments this may comprise transmitting the modulated first and second carrier signals in first and second cells, respectively, of a radio communications network.

In some embodiments, the same technique may be applied to the creation of three (or more) orthogonal channels, rather than just the two channels addressed in blocks 920, 930, 950, and 960. Thus, block 940, which is shown with a dashed outline to indicate that this operation may not appear in every embodiment or instance of the illustrated method, illustrates the generation of a third stream of modulation symbols from a third stream of data bits by successively precoding each data bit or group of data bits in the third stream of data bits. Once more, this precoding comprises mapping each data bit or group of data bits to a corresponding one of the set of predetermined N-symbol sequences according to the value of the data bit or group of data bits. Likewise, block 970 illustrates modulating a third carrier signal with the third stream of modulation symbols, using GMSK or PSK modulation, so that tones resulting from modulating the third carrier signal also occupy the first channel. Here, the modulating comprises rotating modulation symbols in the third stream of modulation symbols or corresponding I/Q samples such that the resulting modulated symbols for the third stream have a different rotation angle than either of the modulated symbols for the second stream and the modulated symbols for the first stream. As shown at block 980, the third carrier signal is transmitted, simultaneously with the transmitting of the modulated first and second carrier signals.

As was the case with the method shown in FIG. 8, the method illustrated in FIG. 9 may be repeated for multiple intervals of time. In some embodiments, the rotation angle for one or more of the orthogonal channels may vary from time to time. Thus, in some embodiments, the method illustrated in FIG. 9 further comprises, for a second interval of time, continuing to generate the first and second streams of modulation symbols and modulating the first and second carrier signals with the first and second streams of modulation symbols, respectively, so that the resulting modulated symbols simultaneously occupy the predetermined frequency range of the modulated carrier signal. In this second interval, this modulating of the first and second carrier signals comprises rotating modulation symbols in at least one of the streams of modulation symbols or corresponding I/Q samples, such that the resulting modulated symbols for the first stream have a different rotation angle than the modulated symbols for the second stream and have a different rotation angle than the modulated symbols for the first stream have for the first time interval.

In any of the various embodiments, the first and/or second intervals of time may each have a duration equal to that of a normal burst duration in a GSM system. As was the case with the process shown in FIG. 8, in some embodiments the method of FIG. 9 may begin with transmitting, to at least one receiving device, an indication of the rotation angle for at least one of the first and second streams of modulation symbols. This is shown at block 910, which, once again, shown with a dashed outline to indicate that it may not be present in every embodiment or instance of the illustrated method.

Figure 10:
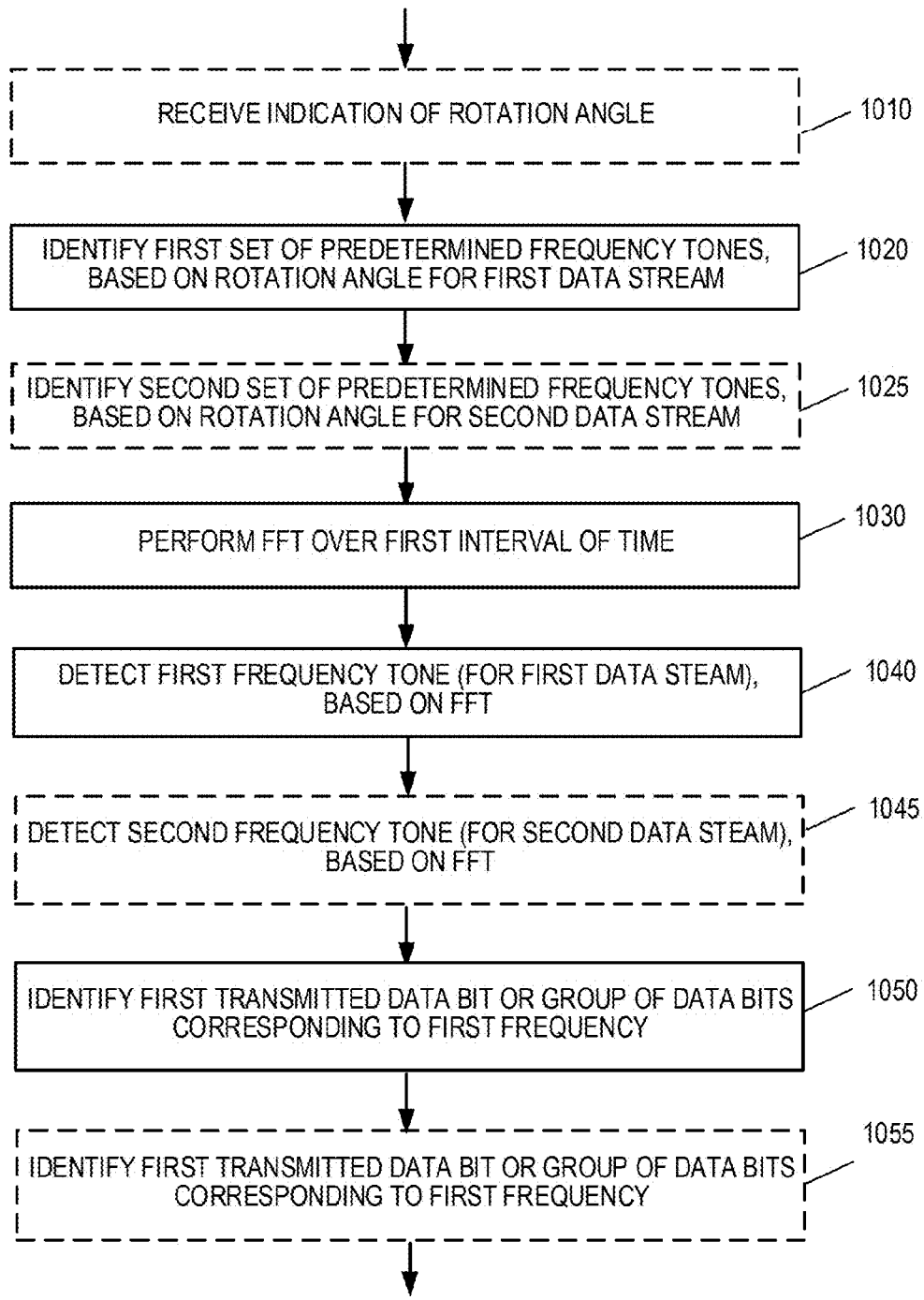
FIG. 10 shows another example method according to some embodiments of the present invention.

FIG. 10 illustrates a method implemented in a radio receiver device, for de-multiplexing a data stream from a single radio channel in a received signal. The method includes, as shown at block 1020, identifying a first set of predetermined frequency tones, based on a first modulation rotation angle for a first data stream among the multiple data streams. The method further includes, as shown at block 1030, performing a first Fast Fourier Transform (FFT) over a first interval of time, wherein the first interval comprises a plurality of Gaussian Minimum-Shift Keying or Phase-Shift Keying (PSK) modulation intervals in the received signal. The method further includes, as shown at block 1040, detecting a first frequency tone, based on the FFT. As shown at block 1050, a first transmitted data bit or group of data bits corresponding to the first frequency tone is then identified, based on a predetermined mapping between each of the predetermined frequency tones of the first set and a corresponding bit or group of data bits.

In some embodiments, the radio receiver may de-multiplex more than one data stream from the single radio channel. In these embodiments, the illustrated method may comprise, as shown at block 1025, identifying a second set of predetermined frequency tones, differing from the first set, based on a modulation rotation angle for a second data stream among the multiple data streams, the modulation rotation angle for the second data stream differing from the first modulation rotation for the first data stream. In these embodiments, as shown at blocks 1045 and 1055, the method further comprises detecting a second frequency tone, based on the first FFT, and identifying a second transmitted data bit or group of data bits corresponding to the second frequency tone, based on a predetermined mapping between each of the predetermined frequency tones of the first set and a corresponding bit or group of data bits. Blocks 1025, 1045, and 1055 are illustrated with dashed outlines, to indicate that they need not be present in every embodiment or instance of the illustrated method.

It will be appreciated that the operations shown at blocks 1020-1055 may be repeated for multiple intervals of time. In some embodiments, the modulation rotation angle used for a given sub-channel may vary from time to time. Thus, in some embodiments, the method further comprises, for a second interval of time: identifying a third set of predetermined frequency tones, differing from the first set, based on a second modulation rotation angle for the first data stream, the second modulation rotation angle for the first data stream differing from the first modulation rotation angle for the first data stream; performing a second Fast Fourier Transform (FFT) over the second interval, differing from the first interval, wherein the second interval comprises a plurality of Gaussian Minimum-Shift Keying or Phase-Shift Keying (PSK) modulation intervals in the received signal; detecting a third frequency tone, based on the second FFT; and identifying a third transmitted data bit or group of data bits corresponding to the third frequency tone, based on a predetermined mapping between each of the predetermined frequency tones of the third set and a corresponding bit or group of data bits.

In some embodiments, the illustrated method further comprises receiving, from a transmitting device, an indication of the first modulation rotation angle for the first data stream. This is shown at block 1010, which is shown with a dashed outline to indicate that it need not be present in every instance or embodiment of the illustrated method.

As discussed above, the several techniques described above may be implemented in one or more base stations or in a wireless device, often using a programmed processing circuit. In such circuits, a computer program for controlling the base station or wireless device to carry out a method embodying any of the presently disclosed techniques is stored in a program storage, which comprises one or several memory devices. Data used during the performance of a method embodying the present invention is stored in a data storage, which also comprises one or more of the same or different memory devices. During performance of a method embodying the present invention, program steps are fetched from the program storage and executed by a processor, retrieving data as required from the data storage. Output information resulting from performance of a method embodying the present invention, can be stored back in the data storage, in some embodiments, or sent to an input/output interface. The processor and its associated data storage and program storage may collectively be referred to as a "processing circuit." It will be appreciated that variations of this processing circuit are possible, including circuits include one or more of various types of programmable circuit elements, e.g., microprocessors, microcontrollers, digital signal processors, field-programmable application-specific integrated circuits, and the like, as well as processing circuits where all or part of the processing functionality described herein is performed using dedicated digital logic.

Accordingly, in various embodiments of the invention, processing circuits like any of those described above are configured to carry out one or more of the techniques described in detail above, including the techniques illustrated in the process flow diagrams of FIGS. 8, 9, and 10. Of course, it will be appreciated that not all of the steps of these techniques are necessarily performed in a single microprocessor or even in a single module.

Figure 11:
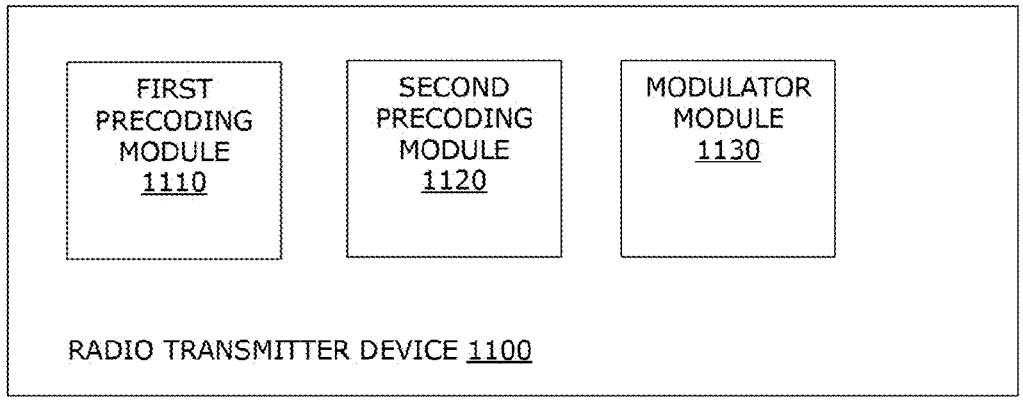
FIG. 11 is a block diagram illustrating an example radio transmitter device, according to some embodiments of the present invention.

It will further be appreciated that various aspects of the above-described above can be understood as being carried out by functional "modules," which may be program instructions executing on an appropriate processor circuit, hard-coded digital circuitry and/or analog circuitry, or appropriate combinations thereof. Thus, for example, FIG. 11 illustrates an example radio transmitter device 1100 for multiplexing multiple data streams for transmission in a single radio channel, and includes a first precoding module 1110 for generating a first stream of modulation symbols by successively precoding each data bit or group of data bits in a first stream of data bits, where this precoding comprises mapping each data bit or group of data bits to a corresponding one of a set of predetermined N-symbol sequences according to the value of the data bit or group of data bits, and where the predetermined N-symbol sequences are selected so that each N-symbol sequence, when fed into a legacy GMSK or 8PSK modulator, yields an output corresponding to a tone out of a predetermined set of tones falling within a predetermined bandwidth, the tone occupying only a fraction of the predetermined bandwidth. The radio transmitter device 1100 further includes a second precoding module 1120 for successively precoding each data bit or group of data bits in a second stream of data bits, where said precoding comprises mapping each data bit or group of data bits to a corresponding one of the set of predetermined N-symbol sequences according to the value of the data bit or group of data bits. Radio transmitter device 1100 further comprises a modulator module 1130 for modulating a carrier signal during the first interval of time with the first and second streams of modulation symbols, using Gaussian Minimum-Shift Keying (GMSK) or Phase-Shift Keying (PSK) modulation, so that tones corresponding to the first and second streams of data bits simultaneously occupy a fraction of a predetermined frequency range corresponding to the predetermined bandwidth, wherein the modulator circuit is further configured to rotate modulation symbols in at least one of the streams of modulation symbols or corresponding I/Q samples such that the resulting modulated symbols for the first stream have a different rotation angle than the modulated symbols for the second stream. It will be appreciated that the precoding modules 1110 and 1120 and modulator module 1130 may be adapted to carry out any of the several variations of the method illustrated in FIG. 8, as described above. Further, it will be appreciated that these modules may also be adapted to carry out all or parts of the method illustrated in FIG. 9, in some embodiments, in the same or in different devices.

Figure 12:
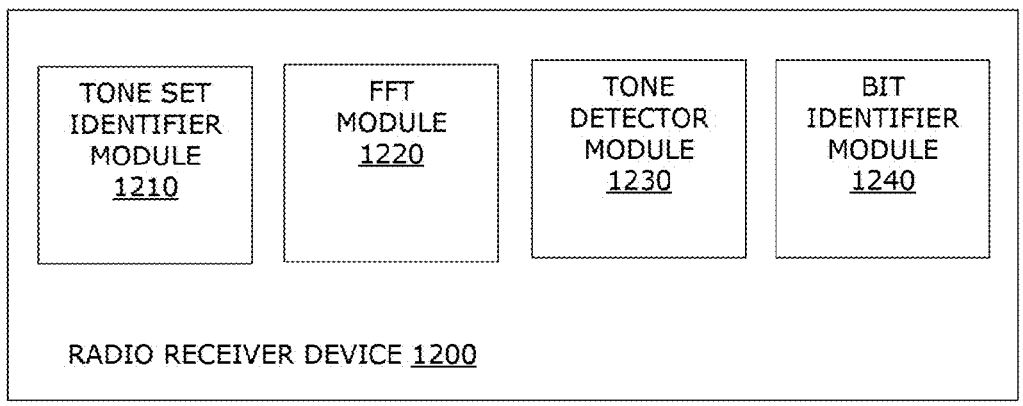
FIG. 12 is a block diagram illustrating an example radio receiver device, according to some embodiments of the present invention.

FIG. 12 illustrates an example radio receiver device 1200 for de-multiplexing a data stream from a single radio channel in a received signal, and includes a tone set identifier module 1210 for identifying a first set of predetermined frequency tones, based on a first modulation rotation angle for a first data stream, and an FFT module 1220 for performing a first FFT over a first interval of time, the first interval comprising a plurality of GMSK or PSK modulation intervals in the received signal. The radio receiver device 1200 further comprises a tone detector module 1230, for detecting a first frequency tone, based on the FTT, and a bit identifier module 1240 for identifying a first transmitted data bit or group of data bits corresponding to the first frequency tone, based on a predetermined mapping between each of the predetermined frequency tones of the first set and a corresponding bit or group of data bits. It will be appreciated that the modules of receiver device 1200 may be adapted to carry out any of the several variations of the method illustrated in FIG. 10, as described above.

Using the techniques and apparatus detailed herein, Narrow Band Hybrid Modulation techniques may be used to improve spectral efficiency through the definition of orthogonal sub-channels in the frequency domain. The improved spectral efficiency will support higher spectral efficiencies in the wireless network.

Examples of several embodiments of the present techniques have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The illustrative embodiments discussed above are thus to be considered in all respects as illustrative and not restrictive.

What is claimed is:

1. A method for multiplexing multiple data streams for transmission in a single radio channel, the method comprising, in a radio transmitter device and for at least a first interval of time:

for a first stream of data bits, generating a first stream of modulation symbols by successively precoding each data bit or group of data bits in the first stream of data bits, wherein said precoding comprises mapping each data bit or group of data bits to a corresponding one of a set of predetermined N-symbol sequences according to the value of the data bit or group of data bits, wherein the predetermined N-symbol sequences are selected so that each N-symbol sequence, when fed into a legacy GMSK or 8PSK modulator, yields an output corresponding to a tone out of a predetermined set of tones falling within a predetermined bandwidth, the tone occupying only a fraction of the predetermined bandwidth;

for a second stream of data bits, generating a second stream of N-symbol sequences by successively precoding each data bit or group of data bits in the second stream of data bits, wherein said precoding comprises mapping each data bit or group of data bits to a corresponding one of the set of predetermined N-symbol sequences according to the value of the data bit or group of data bits;

modulating a carrier signal with the first and second streams of modulation symbols, using Gaussian Minimum-Shift Keying (GMSK) or Phase-Shift Keying (PSK) modulation, so that tones corresponding to the first and second streams of data bits simultaneously occupy a fraction of a predetermined frequency range corresponding to the predetermined bandwidth, wherein said modulating comprises rotating modulation symbols in at least one of the streams of modulation symbols or corresponding I/Q samples such that the resulting modulated symbols for the first stream have a different rotation angle than the modulated symbols for the second stream.

2. The method of claim 1, further comprising transmitting the modulated carrier signal.

3. The method of claim 1, further comprising:

generating a third stream of modulation symbols from a third stream of data bits by successively precoding each data bit or group of data bits in the third stream of data bits, wherein said precoding comprises mapping each data bit or group of data bits to a corresponding one of the set of predetermined N-symbol sequences according to the value of the data bit or group of data bits;

modulating the carrier signal with the third stream of modulation symbols, using GMSK or PSK modulation, so that tones resulting from modulating the carrier signal with the third stream of modulation symbols occupy fractions of the predetermined frequency range, simultaneously with the tones for the first and second streams of data bits but distinct from the fractions occupied by the tones for the first and second streams of data bits, wherein said modulating comprises rotating modulation symbols in the third stream of modulation symbols or corresponding I/Q samples such that the resulting modulated symbols for the third stream have a different rotation angle than either of the modulated symbols for the second stream and the modulated symbols for the first stream.

4. The method of claim 1, further comprising, for a second interval of time:

continuing to generate the first and second streams of modulation symbols; and modulating the carrier signal with the first and second streams of modulation symbols, using GMSK or PSK modulation, so that the resulting modulated symbols simultaneously occupy a predetermined frequency range of the modulated carrier signal, wherein said modulating comprises rotating modulation symbols in at least one of the streams of modulation symbols or corresponding I/Q samples such that the resulting modulated symbols for the first stream have a different rotation angle than the modulated symbols for the second stream and have a different rotation angle than the modulated symbols for the first stream have for the first time interval.

5. The method of claim 4, wherein the first and second intervals of time each have a duration equal to that of a normal burst duration in a GSM system.

6. The method of claim 1, further comprising transmitting, to at least one receiving device, an indication of the rotation angle for at least one of the first and second streams of modulation symbols.

7. A method for generating multiple carrier signals, the method comprising, in one or more radio transmitter devices and for at least a first interval of time:

for a first stream of data bits, generating a first stream of modulation symbols by successively precoding each data bit or group of data bits, wherein said precoding comprises mapping each data bit or group of data bits in the first stream to a corresponding one of a set of predetermined N-symbol sequences according to the value of the data bit or group of data bits, wherein the first and second predetermined N-symbol sequences are selected so that each N-symbol sequence, when fed into a legacy GMSK or 8PSK modulator, yields an output corresponding to a tone out of a predetermined set of tones falling within a predetermined bandwidth, the tone occupying only a fraction of the predetermined bandwidth;

for a second stream of data bits, generating a second stream of modulation symbols by successively precoding each data bit or group of data bits, wherein said precoding comprises mapping each data bit or group of data bits in the second stream to a corresponding one of the set of predetermined N-symbol sequences according to the value of the data bit or group of data bits;

modulating a first carrier signal with the first stream of modulation symbols, using Gaussian Minimum-Shift Keying (GMSK) or Phase-Shift Keying (PSK) modulation, so that tones resulting from said modulating occupy a first predetermined frequency range of the modulated first carrier signal;

modulating a second carrier signal with the second stream of modulation symbols, using GMSK or PSK modulation, so that tones resulting from modulating the second carrier frequency signal with the second stream of modulation symbols also occupy the first predetermined frequency range; and simultaneously transmitting the modulated first and second carrier signals;

wherein the modulating of the first and second carrier signals comprises rotating modulation symbols in at least one of the streams of modulation symbols or corresponding I/Q samples, such that the resulting modulated symbols on the modulated first carrier signal have a different rotation angle than the modulated symbols on the modulated second carrier signal.

8. The method of claim 7, wherein transmitting the modulated first and second carrier signals comprises transmitting the modulated first and second carrier signals in first and second cells, respectively, of a radio communications network.

9. The method of claim 7, further comprising:
generating a third stream of modulation symbols from a third stream of data bits by successively precoding each data bit or group of data bits in the third stream of data bits, wherein said precoding comprises mapping each data bit or group of data bits to a corresponding one of the set of predetermined N-symbol sequences according to the value of the data bit or group of data bits;
modulating a third carrier signal with the third stream of modulation symbols, using GMSK or PSK modulation, so that tones resulting from modulating the third carrier signal also occupy the first predetermined frequency range, wherein said modulating comprises rotating modulation symbols in the third stream of modulation symbols or corresponding I/Q samples such that the resulting modulated symbols for the third stream have a different rotation angle than either of the modulated symbols for the second stream and the modulated symbols for the first stream; and
transmitting the modulated third carrier signal, simultaneously with the transmitting of the modulated first and second carrier signals.

10. The method of any of claim 7, further comprising, for a second interval of time:
continuing to generate the first and second streams of modulation symbols; and
modulating the first and second carrier signals with the first and second streams of modulation symbols, respectively, so that the resulting modulated symbols simultaneously occupy the predetermined frequency range of the modulated carrier signal and wherein said modulating comprises rotating modulation symbols in at least one of the streams of modulation symbols or corresponding I/Q samples such that the resulting modulated symbols for the first stream have a different rotation angle than the modulated symbols for the second stream and have a different rotation angle than the modulated symbols for the first stream have for the first time interval.

11. The method of claim 10, wherein the first and second intervals of time each have a duration equal to that of a normal burst duration in a GSM system.

12. The method of claim 7, further comprising transmitting, to at least one receiving device, an indication of the rotation angle for at least one of the first and second streams of modulation symbols.

13. A method for de-multiplexing a data stream from a single radio channel in a received signal, the method comprising, in a radio receiver device and for a first interval of time:
identifying a first set of predetermined frequency tones, based on a first modulation rotation angle for a first data stream;
performing a first Fast Fourier Transform (FFT) over the first interval, wherein the first interval comprises a plurality of Gaussian Minimum-Shift Keying or Phase-Shift Keying (PSK) modulation intervals in the received signal;
detecting a first frequency tone, based on the FFT; and
identifying a first transmitted data bit or group of data bits corresponding to the first frequency tone, based on a predetermined mapping between each of the predetermined frequency tones of the first set and a corresponding bit or group of data bits.

14. The method of claim 13, further comprising, for the first interval of time:
identifying a second set of predetermined frequency tones, differing from the first set, based on a modulation rotation angle for a second data stream among the multiple data streams, the modulation rotation angle for the second data stream differing from the first modulation rotation for the first data stream;
detecting a second frequency tone, based on the first FFT; and
identifying a second transmitted data bit or group of data bits corresponding to the second frequency tone, based on a predetermined mapping between each of the predetermined frequency tones of the first set and a corresponding bit or group of data bits.

15. The method of claim 13, further comprising, for a second interval of time:
identifying a third set of predetermined frequency tones, differing from the first set, based on a second modulation rotation angle for the first data stream, the second modulation rotation angle for the first data stream differing from the first modulation rotation angle for the first data stream;
performing a second Fast Fourier Transform (FFT) over the second interval, differing from the first interval, wherein the second interval comprises a plurality of Gaussian Minimum-Shift Keying or Phase-Shift Keying (PSK) modulation intervals in the received signal;
detecting a third frequency tone, based on the second FFT; and
identifying a third transmitted data bit or group of data bits corresponding to the third frequency tone, based on a predetermined mapping between each of the predetermined frequency tones of the third set and a corresponding bit or group of data bits.

16. The method of claim 15, wherein the first and second intervals each correspond to a normal burst duration in a GSM system.

17. The method of claim 13, further comprising receiving, from a transmitting device, an indication of the first modulation rotation angle for the first data stream.

18. A radio transmitter device for multiplexing multiple data streams for transmission in a single radio channel, the radio transmitter device comprising:
a processing circuit configured to, for a first stream of data bits, generate a first stream of modulation symbols by successively precoding each data bit or group of data bits in the first stream of data bits, wherein said precoding comprises mapping each data bit or group of data bits to a corresponding one of a set of predetermined N-symbol sequences according to the value of the data bit or group of data bits, wherein the predetermined N-symbol sequences are selected so that each N-symbol sequence, when fed into a legacy GMSK or 8PSK modulator, yields an output corresponding to a tone out of a predetermined set of tones falling within a predetermined bandwidth, the tone occupying only a fraction of the predetermined bandwidth, and wherein the processing circuit is further configured to, for a second stream of data bits, generate a second stream of N-symbol sequences by successively precoding each data bit or group of data bits in the second stream of data bits, wherein said precoding comprises mapping each data bit or group of data bits to a corresponding one of the set of predetermined N-symbol sequences according to the value of the data bit or group of data bits; and a modulator circuit configured to modulate a carrier signal during the first interval of time with the first and second streams of modulation symbols, using Gaussian Minimum-Shift Keying (GMSK) or Phase-Shift Keying (PSK) modulation, so that tones corresponding to the first and second streams of data bits simultaneously occupy a fraction of a predetermined frequency range corresponding to the predetermined bandwidth, wherein the modulator circuit is further configured to rotate modulation symbols in at least one of the streams of modulation symbols or corresponding I/Q samples such that the resulting modulated symbols for the first stream have a different rotation angle than the modulated symbols for the second stream.

19. The radio transmitter device of claim 18, further comprising a transmitter circuit, wherein the processing circuit is configured to control the transmitter circuit to transmit the modulated carrier signal.

20. The radio transmitter device of claim 18, wherein:
the processing circuit is further configured to generate a third stream of modulation symbols from a third stream of data bits by successively precoding each data bit or group of data bits in the third stream of data bits, wherein said precoding comprises mapping each data bit or group of data bits to a corresponding one of the set of predetermined N-symbol sequences according to the value of the data bit or group of data bits; and
the modulator circuit is further configured to modulate the carrier signal with the third stream of modulation symbols, using GMSK or PSK modulation, so that tones resulting from modulating the carrier signal with the third stream of modulation symbols occupy fractions of a predetermined frequency range corresponding to the predetermined bandwidth, simultaneously with the tones for the first and second streams of data bits but distinct from the fractions occupied by the tones for the first and second streams of data bits, wherein said modulating comprises rotating modulation symbols in the third stream of modulation symbols or corresponding I/Q samples such that the resulting modulated symbols for the third stream have a different rotation angle than either of the modulated symbols for the second stream and the modulated symbols for the first stream.

21. The radio transmitter device of claim 18, wherein:
the processing circuit is further configured to, for a second interval of time, continue generating the first and second streams of modulation symbols; and
the modulator circuit is configured to modulate the carrier signal in the second interval of time with the first and second streams of modulation symbols, using GMSK or PSK modulation, so that the resulting modulated symbols simultaneously occupy the predetermined frequency range of the modulated carrier signal, wherein said modulating comprises rotating modulation symbols in at least one of the streams of modulation symbols or corresponding I/Q samples such that the resulting modulated symbols for the first stream have a different rotation angle than the modulated symbols for the second stream and have a different rotation angle than the modulated symbols for the first stream have for the first time interval.

22. The radio transmitter device of claim 21, wherein the first and second intervals of time each have a duration equal to that of a normal burst duration in a GSM system.

23. The radio transmitter device of claim 18, wherein the processing circuit is further configured to control the transmitter circuit to transmit, to at least one receiving device, an indication of the rotation angle for at least one of the first and second streams of modulation symbols.

24. A radio transmitter apparatus for generating multiple carrier signals, the radio transmitter apparatus comprising:
a first processing circuit configured to, for a first interval of time, generate a first stream of modulation symbols for a first stream of data bits by successively precoding each data bit or group of data bits, wherein said precoding comprises mapping each data bit or group of data bits in the first stream to a corresponding one of a set of predetermined N-symbol sequences according to the value of the data bit or group of data bits, wherein the first and second predetermined N-symbol sequences are selected so that each N-symbol sequence, when fed into a legacy GMSK or 8PSK modulator, yields an output corresponding to a tone out of a predetermined set of tones falling within a predetermined bandwidth, the tone occupying only a fraction of the predetermined bandwidth;
a second processing circuit configured to, for the first interval of time, generate a second stream of modulation symbols for a second stream of data bits by successively precoding each data bit or group of data bits, wherein said precoding comprises mapping each data bit or group of data bits in the second stream to a corresponding one of the set of predetermined N-symbol sequences according to the value of the data bit or group of data bits; and
a first modulator circuit configured to modulate a first carrier signal with the first stream of modulation symbols, using Gaussian Minimum-Shift Keying (GMSK) or Phase-Shift Keying (PSK) modulation, so that tones resulting from said modulating occupy a first predetermined frequency range of the modulated first carrier signal; and
a second modulator circuit configured to modulate a second carrier signal with the second stream of modulation symbols, using GMSK or PSK modulation, so that tones resulting from modulating the second carrier signal with the second stream of modulation symbols also occupy the first predetermined frequency range; and
transmitter circuits configured to simultaneously transmit the modulated first and second carrier signals;
wherein the first and second modulator circuits are configured to modulate the first and second carrier signals by rotating modulation symbols in at least one of the streams of modulation symbols or corresponding I/Q samples, such that the resulting modulated symbols on the modulated first carrier signal have a different rotation angle than the modulated symbols on the modulated second carrier signal.

25. The radio transmitter apparatus of claim 24, wherein the transmitter circuits are configured to transmit the modulated first and second carrier signals in first and second cells, respectively, of a radio communications network.

26. The radio transmitter apparatus of claim 24, further comprising:
a third processing circuit configured to generate a third stream of modulation symbols from a third stream of data bits by successively precoding each data bit or group of data bits in the third stream of data bits, wherein said precoding comprises mapping each data bit or group of data bits to a corresponding one of the set of predetermined N-symbol sequences according to the value of the data bit or group of data bits; and a third modulator circuit configured to modulate a third carrier signal with the third stream of modulation symbols, using GMSK or PSK modulation, so that tones resulting from modulating the third carrier signal also occupy the first predetermined frequency range, wherein said modulating comprises rotating modulation symbols in the third stream of modulation symbols or corresponding I/Q samples such that the resulting modulated symbols for the third stream have a different rotation angle than either of the modulated symbols for the second stream and the modulated symbols for the first stream; and an additional transmitter circuit configured to transmit the modulated third carrier signal, simultaneously with the transmitting of the modulated first and second carrier signals.

27. The radio transmitter apparatus of claim 24, wherein:
the first and second processing circuits are configured to, for a second interval of time, continue to generate the first and second streams of modulation symbols; and
the first and second modulator circuits are configured to modulate the first and second carrier signals with the first and second streams of modulation symbols, respectively, during the second interval of time, so that the resulting modulated symbols simultaneously occupy the predetermined frequency range of the modulated carrier signal and wherein said modulating comprises rotating modulation symbols in at least one of the streams of modulation symbols or corresponding I/Q samples such that the resulting modulated symbols for the first stream have a different rotation angle than the modulated symbols for the second stream and have a different rotation angle than the modulated symbols for the first stream have for the first time interval.

28. The radio transmitter apparatus of claim 27, wherein the first and second intervals of time each have a duration equal to that of a normal burst duration in a GSM system.

29. The radio transmitter apparatus of claim 24, wherein the transmitter circuits are configured to transmit, to at least one receiving device, an indication of the rotation angle for at least one of the first and second streams of modulation symbols.

30. A radio receiver device for de-multiplexing a data stream from a single radio channel in a received signal, the radio receiver device comprising a processing circuit configured to, for a first interval of time:
identify a first set of predetermined frequency tones, based on a first modulation rotation angle for a first data stream;
perform a first Fast Fourier Transform (FFT) over the first interval, wherein the first interval comprises a plurality of Gaussian Minimum-Shift Keying or Phase-Shift Keying (PSK) modulation intervals in the received signal;
detect a first frequency tone, based on the FFT; and
identify a first transmitted data bit or group of data bits corresponding to the first frequency tone, based on a predetermined mapping between each of the predetermined frequency tones of the first set and a corresponding bit or group of data bits.

31. The radio receiver device of claim 30, wherein the processing circuit is further configured to, for the first interval of time:
identify a second set of predetermined frequency tones, differing from the first set, based on a modulation rotation angle for a second data stream among the multiple data streams, the modulation rotation angle for the second data stream differing from the first modulation rotation for the first data stream;
detect a second frequency tone, based on the first FFT; and
identify a second transmitted data bit or group of data bits corresponding to the second frequency tone, based on a predetermined mapping between each of the predetermined frequency tones of the first set and a corresponding bit or group of data bits.

32. The radio receiver device of claim 30, wherein the processing circuit is further configured to, for a second interval of time:
identify a third set of predetermined frequency tones, differing from the first set, based on a second modulation rotation angle for the first data stream, the second modulation rotation angle for the first data stream differing from the first modulation rotation angle for the first data stream;
perform a second Fast Fourier Transform (FFT) over the second interval, differing from the first interval, wherein the second interval comprises a plurality of Gaussian Minimum-Shift Keying or Phase-Shift Keying (PSK) modulation intervals in the received signal;
detect a third frequency tone, based on the second FFT; and
identify a third transmitted data bit or group of data bits corresponding to the third frequency tone, based on a predetermined mapping between each of the predetermined frequency tones of the third set and a corresponding bit or group of data bits.

33. The radio receiver device of claim 32, wherein the first and second intervals each correspond to a normal burst duration in a GSM system.

34. The radio receiver device of claim 30, further comprising a receiver circuit, wherein the processing circuit is further configured to use the receiver circuit to receive, from a transmitting device, an indication of the first modulation rotation angle for the first data stream.

* * * * *